April 14, 1925.  1,533,718
T. R. WOLLASTON
DEVICE FOR DEFLECTING, OPENING, AND CRUSHING FUEL OR
MATERIAL IN A RETORT ABOVE A GAS PRODUCER
Filed Oct. 22, 1923  2 Sheets-Sheet 1
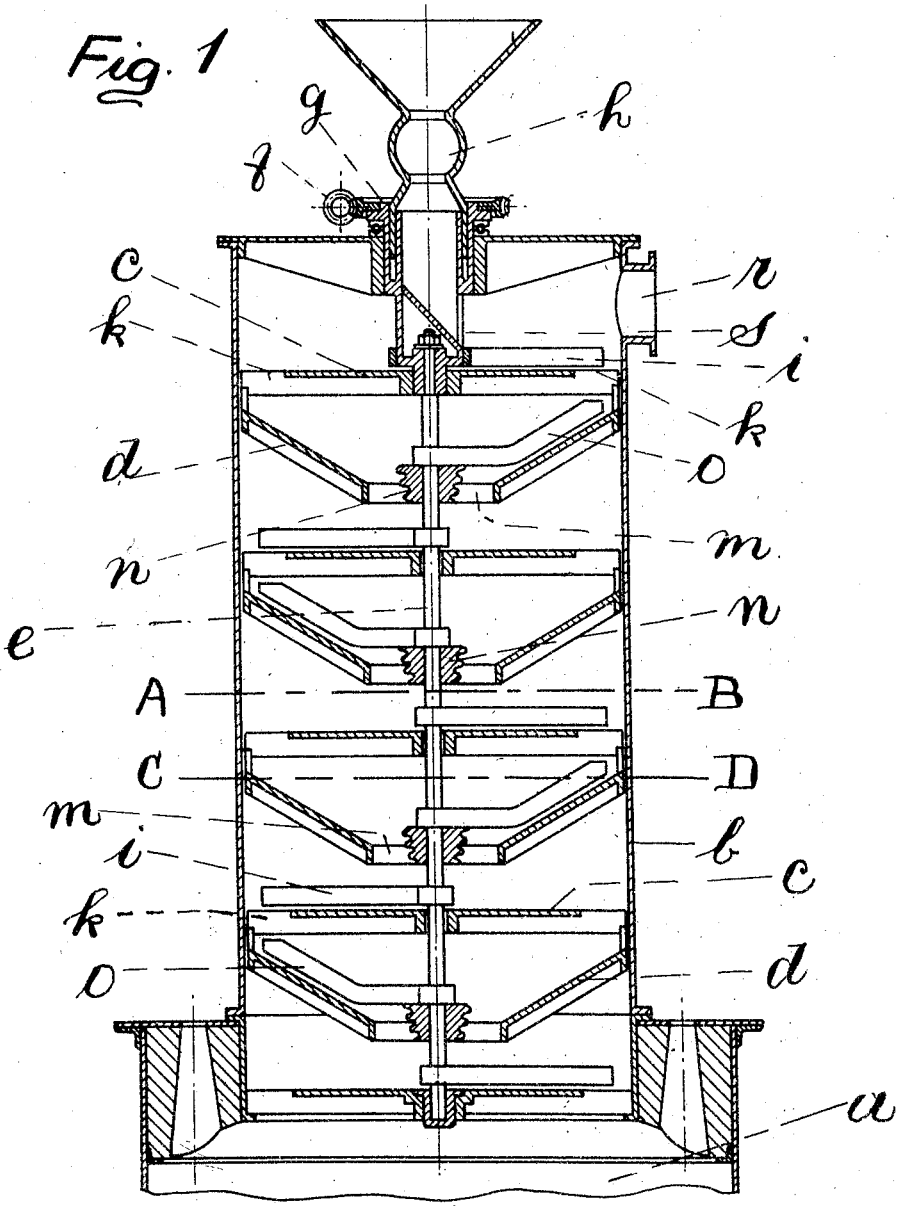
Inventor
Thomas Roland Wollaston
per Arthur Gadd
Attorney.

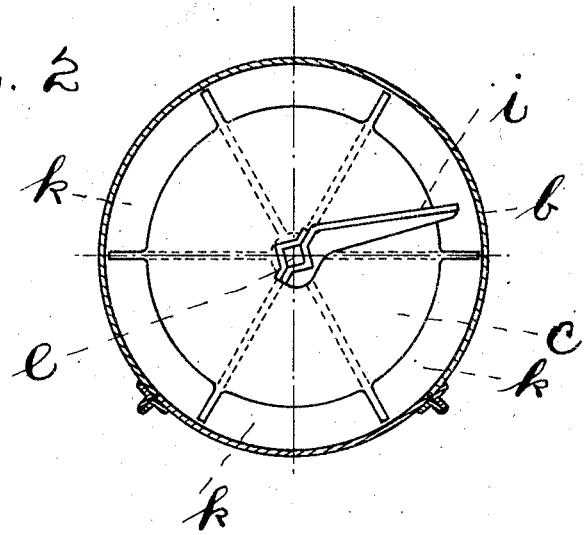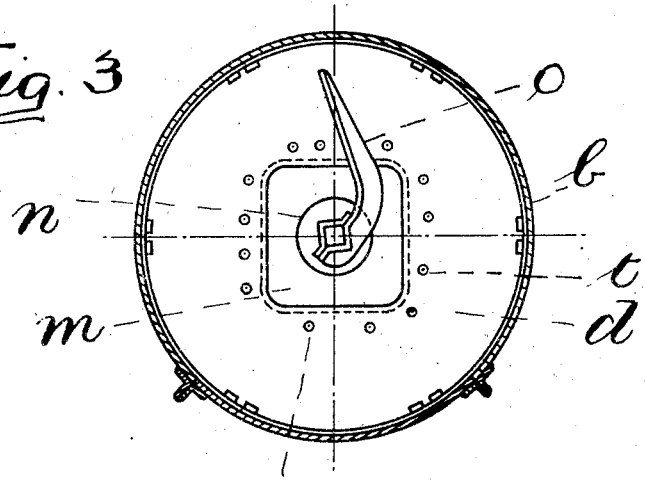

Patented Apr. 14, 1925.

1,533,718

UNITED STATES PATENT OFFICE.

THOMAS ROLAND WOLLASTON, OF MANCHESTER, ENGLAND.

DEVICE FOR DEFLECTING, OPENING, AND CRUSHING FUEL OR MATERIAL IN A RETORT ABOVE A GAS PRODUCER.

Application filed October 22, 1923. Serial No. 670,028.

*To all whom it may concern:*

Be it known that I, THOMAS ROLAND WOLLASTON, a subject of the King of Great Britain, residing at Manchester, in the county of Lancaster, England, have invented certain new and useful Improvements in a Device for Deflecting, Opening, and Crushing Fuel or Material in a Retort Above a Gas Producer, of which the following is a specification.

The invention is for a deflecting, opening and crushing device within a retort above a producer, of that type in which the gases from the producer pass through said retort to outlet, and primary or semidistillation of coal or shale takes place in such retort prior to gasification in the producer.

The object of the invention is to provide means for deflecting and disturbing the material moved or being moved through the retort, and for determining the dimensions of the component parts of the material by suitably situated crushing members.

The means adopted form an improvement upon those already arranged according to prior inventions of mine and described in the specification of British Patent No. 207,700 of November 30th 1922, and in the specification of United States Patent No. 1,327,893, of January 19th 1918, and the main result desired is to facilitate the picking up from the new coal or material of the volatile constituents during coking, including ammonia, by the outgoing gas, by bringing said outgoing hot gas in intimate contact with the material in the retort referred to. That is to say, a resulting effect is attained similar to that described in the specifications of my aforesaid patent wherein certain coking and gas-distributing operations are controlled for the purpose therein stated.

According to my present invention, I provide the retort mounted above a gas producer with a series of stages or floors, at different levels, for supporting the material moved through said retort, which stages are fixed in position and alternately provided with central and peripheral outlets; and adjacent to these stages I provide independent movable material-disturbing members or ploughs, for opening and, where necessary, deflecting said material. These are so arranged that at alternate stages they feed the material outwardly towards the peripheral outlets named and at the remaining stages containing the central outlets they operate in conjunction with serrated or suitable crushing members for breaking the coke as it tends to cake together. These crushing members are movably operated for the purpose of reducing the size of the larger pieces of material passing through the retort as stated.

With reference to the accompanying drawings illustrating one form of the invention, Fig. 1 is a sectional elevation of a retort and the upper portion of a producer on which it is mounted, the former provided with means according to my present invention. Fig. 2 is a transverse section through line A..B of Fig. 1 and Fig. 3 a similar section to Fig. 2 through line C..D of said Fig. 1.

$a$ is the producer, and $b$ the shell of the retort mounted above and in connection with the same. The latter is internally divided into stages by means of fixed divisions or floors, $c$, $d$. In the form illustrated, the retort is provided with a central revoluble shaft $e$ here driven by worm and wheel gearing $f$ and $g$, the former being under control and operated by means in connection with suitable driving power, whether intermittently, continually or variably. The fuel enters from a fuel hopper through a feed valve $h$ and falls on to the upper stage or flooring $c$ forming the first of a series.

I prefer to provide the various floorings alternately horizontal as at $c$ and inclined as at $d$. A deflecting member or plough device $i$ is indicated above the level of each horizontal floor, and projecting from and attached to the revoluble shaft $e$, which member or plough in each case by its consequent movement tends to force the material supplied towards the outer part of the floor area considered and to disturb or open up the same for which deflecting purpose the member is suitably shaped. In the present instance it is formed with a surface which is tangential to a small circle about the axis of the shaft $e$, but the shape may be varied for the purpose stated.

Apertures $k$ are provided at or near the outer edge parts of the floorings $c$, and central apertures $m$ are provided for the floorings $d$. At or about the centre of each of the last named apertures is provided a crushing member, here in the form of a taper worm n and here attached to the shaft e. Further plough devices o are also shown attached to the shaft e, operating to prevent settling of material on the flooring and which may be suitably shaped such as similarly to the members i in plan.

Any or all of the floors or stages may be perforated or formed with smaller apertures to those already named, such as holes in the floors d and around the apertures m, or elsewhere. The gas outlet from retort b is indicated at r in Fig. 1.

By the means described, it will be seen that fuel or material from the hopper falling through a feed valve h into and out through an aperture therein at s reaches the first stage c and is moved around and outwardly as well as ploughed up by member i until said material in a gradual manner falls through the aperture k on to flooring d, below where it is subjected to the movement of member o thereat.

As such treated material falls through the aperture m in said floor d large pieces coked together are reduced by grinding action at the moving worm or crushing member n.

In similar manner the material is treated at the various stages, as it moves and falls, or it is subjected to an opening and mixing process by reason of being in contact with two relatively moving parts, namely a fixed flooring and a moving plough or stirring device. On falling through the lowermost aperture into the producer a it is in a suitably pre-carbonized and graded condition for further treatment therein. Gases from the producer are, during the operations referred to, able to pass through the various apertures in the retort b and intermingle with the opened out material, and finally escape through outlet r, perforations such as at t, in the floorings where employed, facilitating the passage of the gases referred to. The gas from the producer is deflected by the alternate arrangement of apertures at the various stages, as it passes upwards therethrough.

I claim:—

1. In a continuously carbonizing retort mounted in gas communication with a gas producer, and provided with fixed floors or stages alternate peripheral and central apertures therein and movable ploughs adjacent to said stages, movable material-crushing members at such central apertures and gearing and connections operating said ploughs and crushing members, substantially as herein set forth.

2. In a continuously carbonizing retort mounted above and in gas communication with a gas producer and provided with fixed floors or stages, alternate peripheral and central apertures therein and movable ploughs adjacent to said stages, movable material-crushing members attached to a central revoluble shaft and at or about the central apertures referred to, worm and wheel gearing in connection with and operated for revolving said shaft, for the purpose and in manner substantially as herein set forth.

In testimony whereof I have affixed my signature.

THOMAS ROLAND WOLLASTON.